（12）United States Patent
Olarig et al.

(10) Patent No.: US 10,996,899 B2
(45) Date of Patent: *May 4, 2021

(54) SYSTEM AND METHOD OF CONFIGURING NVME-OF DEVICES USING A BASEBOARD MANAGEMENT CONTROLLER (BMC)

(71) Applicant: Samsung Electronics Co., Ltd., Suwon-si (KR)

(72) Inventors: Sompong Paul Olarig, Pleasanton, CA (US); Son T. Pham, San Ramon, CA (US); Ramdas Kachare, Cupertino, CA (US)

(73) Assignee: Samsung Electronics Co., Ltd.

( * ) Notice: Subject to any disclaimer, the term of this patent is extended or adjusted under 35 U.S.C. 154(b) by 0 days.

This patent is subject to a terminal disclaimer.

(21) Appl. No.: 16/540,989

(22) Filed: Aug. 14, 2019

(65) Prior Publication Data

US 2019/0377496 A1    Dec. 12, 2019

Related U.S. Application Data

(63) Continuation of application No. 15/489,416, filed on Apr. 17, 2017, now Pat. No. 10,459,665.

(60) Provisional application No. 62/480,670, filed on Apr. 3, 2017.

(51) Int. Cl.
*G06F 3/06* (2006.01)
*H04L 12/931* (2013.01)
(Continued)

(52) U.S. Cl.
CPC ............ *G06F 3/067* (2013.01); *G06F 3/0604* (2013.01); *G06F 3/0635* (2013.01);
(Continued)

(58) Field of Classification Search
CPC ...... G06F 13/14; G06F 13/385; G06F 3/0604; G06F 3/0629; G06F 3/0653; G06F 3/0683; G06F 3/0655; G06F 3/067
See application file for complete search history.

(56) References Cited

U.S. PATENT DOCUMENTS 8,977,733 B1 * 3/2015 Phuong ................... H04L 12/12
709/223
9,280,504 B2    3/2016 Ben-Michael et al.
(Continued)

FOREIGN PATENT DOCUMENTS

CN    105808407 A    7/2016

OTHER PUBLICATIONS

"Demystifying: What is NVMeOF?," 2018 StorPool Storage, pp. 1-8. website: https://storpool.com/.
(Continued)

*Primary Examiner* — Zhuo H Li
(74) *Attorney, Agent, or Firm* — Innovation Counsel LLP

(57) ABSTRACT

Disclosed herein is a computer storage array providing one or more remote initiators with NVMe over Fabrics (NVMe-oF) access to one or more storage devices connected to the storage array. According to an example embodiment, the computer storage array comprises: a computer processor configured to run an operating system for managing networking protocols; a network switch configured to establish an NVMe-oF connection and route data between the initiators and the storage devices; a baseboard management controller (BMC) configured to configure a network setting or NVMe-oF setting of the storage devices; a PCIe switch connecting the BMC with each of the storage devices via a PCIe bus; and a computer motherboard including the PCIe bus and to which the computer processor, network switch, BMC and PCIe switch are installed.

20 Claims, 2 Drawing Sheets

(51) Int. Cl.
*H04L 12/24* (2006.01)
*H04L 29/08* (2006.01)
(52) U.S. Cl.
CPC ........ *H04L 41/0806* (2013.01); *H04L 49/356* (2013.01); *H04L 49/357* (2013.01); *H04L 67/1097* (2013.01)

(56) References Cited

U.S. PATENT DOCUMENTS

| | | |
|---|---|---|
| 10,042,583 B2 | 8/2018 | Qiu et al. |
| 2014/0101653 A1* | 4/2014 | Dharmadhikari ......... G06F 8/65 717/173 |
| 2014/0195634 A1 | 7/2014 | Kishore et al. |
| 2017/0031857 A1 | 2/2017 | Qiu |
| 2018/0101376 A1 | 4/2018 | Olarig et al. |
| 2018/0157612 A1 | 6/2018 | Chen |
| 2018/0239540 A1 | 8/2018 | Kachare et al. |
| 2018/0260135 A1* | 9/2018 | Hayashida .......... G06F 13/4282 |
| 2018/0335958 A1 | 11/2018 | Wu et al. |

OTHER PUBLICATIONS

"NVM Express," 2018 Wikipedia, pp. 1-10. website: https://en.wikipedia.org/w/index.php?title=NVM_Express&oldid=867841850.

"NVM Express over Fabrics: Revision 1.0," 2007-2016 NVM Express, Inc., pp. 1-49.

* cited by examiner

SYSTEM AND METHOD OF CONFIGURING NVME-OF DEVICES USING A BASEBOARD MANAGEMENT CONTROLLER (BMC)

CROSS-REFERENCE TO RELATED APPLICATIONS

This application is a continuation of U.S. patent application Ser. No. 15/489,416, filed Apr. 17, 2017, which claims priority to and the benefit of U.S. Provisional Patent Application No. 62/480,670, titled "Method of Configuring Networking Controllers and Settings of NVMe-oF Devices via Control Plane (BMC)" and filed on Apr. 3, 2017, the entire content which is incorporated herein by reference.

RELATED FIELD

The present disclosure relates to computer storage arrays. In particular, the present disclosure relates to a system and method of configuring target storage devices connected to a computer storage array.

BACKGROUND

A computer storage array, also called a disk array, is generally a data storage system to which a number of data storage devices, such as hard disk drives (HDDs) and solid-state disk drives (SSDs), are connected. Computer storage arrays are designed to be highly scalable and offer shared data access to multiple initiators, who may be end-point clients, computer servers, and/or other data consumers.

Storage devices that support the Non-Volatile Memory Express over Fabrics (NVMe-oF) specification (hereinafter, "NVMe-oF devices" for convenience) are becoming more popular, especially for use in computer storage arrays, due to their high performance and scalability. NVMe-oF is a technology specification designed to enable NVMe message-based commands to transfer data between an initiator, such as a host computer, and an NVMe-oF device or system over a network such as Ethernet, Fibre Channel, and InfiniBand. Thus, an NVMe-oF device generally includes functions of both a networking device (e.g., has Ethernet controller(s)) and a storage device (e.g., has SSD(s)).

As a networking device, the networking settings of an NVMe-oF device would need to be configured before an initiator can establish an NVMe-oF connection with the NVMe-oF device. One possible solution is to develop an NVMe-oF Device Driver for Linux and Windows similar to a Network Interface Controller (NIC) or host bus adapter such as RAID vendors. The advantages of providing a device driver are similar to those of existing methods of configuring a network controller card by using existing network configuration tools. However, this is not a typical business model, and storage manufactures may not have the competency to develop a new storage device driver for Linux and Windows, maintain the device driver for each distribution and support to Linux open source community.

Another prior art method is to have a default static IP address known to the host assigned to each NVMe-oF device. In this case, all NVMe-oF devices will have the same static default IP address initially. The network interface of the NVMe-oF can be configured through the network device driver or hardcoded from the manufacturer. Unfortunately, this model does not fit well with the current standard storage devices since only a storage protocol driver (not device configuration) is provided for these storage devices. After the host communicates to the target via the default IP address, then the IP address can be changed. However, this is a slow process since some NVMe-oF devices may connect to different initiators. In addition, this may not work when all the NVMe-oF are connected to an Ethernet switch and they all have the same IP address. Furthermore, the NVMe-oF standard specification does not disclose how. A better solution is to enable users or system admin to dynamically configure these devices through the control plane during system initialization, according to the presently disclosed system and method. There may be additional requirements for the NVMe-oF to be configured correctly. For example, the NVMe-oF device may be required to be configured according to which RDMA protocol (RoCE2 vs iWARP) it needs to support.

Although the local computer processing unit (CPU) of a computer storage array may be used to configure the network settings (e.g., IP address) of the NVMe-oF device, which is connected to the CPU via a control plane, doing so would require the CPU to perform context switching between synchronous and asynchronous processes, thereby increasing the chances of crashing the storage array. The chances of crashing are increased when a plurality of NVMe-oF devices connected to the storage array needs to be configured. Furthermore, the current NVMe-oF specification does not specify how to configure the Ethernet controllers of an NVMe-oF device via the control plane. As such, using the CPU of the storage array to configure the NVMe-oF devices may not be desirable.

As a storage device, the NVMe-oF settings of the NVMe-oF device would also need to be configured before running data traffic. Although the local CPU of the storage array may also be used to configure the NVMe-oF settings (e.g., NVMe Qualified name, size of Admin Submission Queue, etc.) of the NVMe-oF device, it may not be desirable for the same reasons discussed above. If one or more initiators have established a network connection with the NVMe-oF device, the initiators may also configure the NVMe-oF settings of the NVMe-oF device. However, each of the initiators would have to configure their own target NVMe-oF devices, which would complicate the configuration process. Furthermore, because the initiators are connected to the NVMe-oF devices over a data plane, rather than the control plane, tasking the initiators with configuring the NVMe-oF devices may take much longer time and negatively impact how soon the system is ready for the data transfer. As such, it may not be desirable for the initiators configure the NVMe-oF devices.

SUMMARY

Disclosed herein is a computer storage array providing one or more remote initiators with NVMe over Fabrics (NVMe-oF) access to one or more storage devices connected to the storage array. According to an example embodiment, the computer storage array comprises: a computer processor configured to run an operating system for managing networking protocols; a network switch configured to establish an NVMe-oF connection and route data between the initiators and the storage devices; a baseboard management controller (BMC) configured to configure a network setting or NVMe-oF setting of the storage devices; a PCIe switch connecting the BMC with each of the storage devices via a PCIe bus; and a computer motherboard including the PCIe bus and to which the computer processor, network switch, BMC and PCIe switch are installed.

Further disclosed herein is a computer-implemented method of configuring one or more storage devices connected to a computer storage array, the computer storage array comprising a computer processor configured to run an operating system for managing networking protocols and a baseboard management controller (BMC) configured to configure a network setting or NVMe-oF setting of the storage devices, the BMC connected by a local PCIe switch to each of the storage devices via a PCIe bus. According to an example embodiment, the method comprises: receiving, by the BMC, a command and a parameter value, from a management server, for configuring the network setting or NVMe-oF setting of a storage device; and configuring the network setting or NVMe-oF setting of the storage device, by the BMC, according to the commands and parameter values received from the management server.

BRIEF DESCRIPTION OF THE DRAWINGS

The accompanying drawings, which are included as part of the present disclosure, illustrate various embodiments and together with the general description given above and the detailed description of the various embodiments given below serve to explain and teach the principles described herein.

Figure 1:
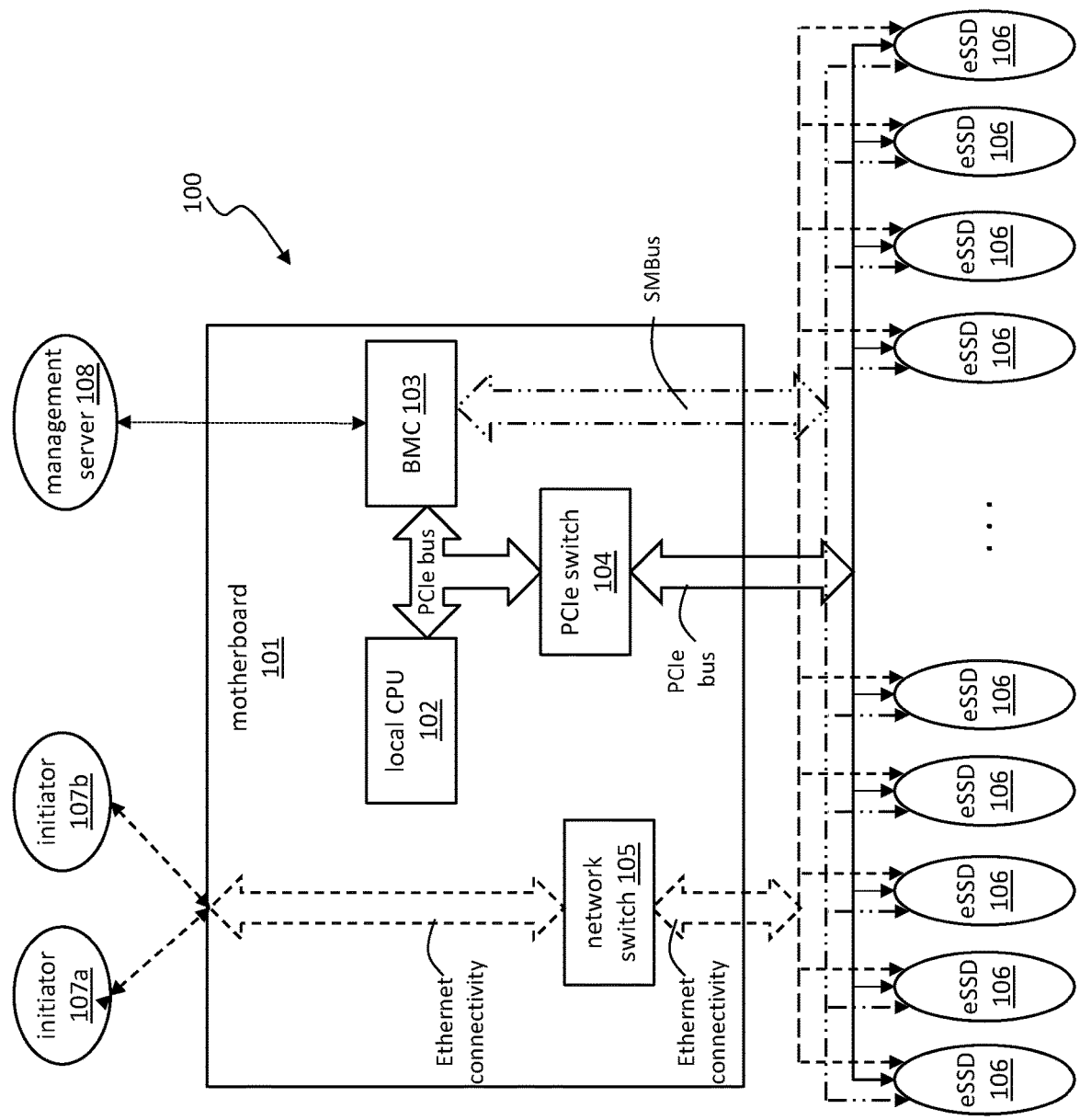
FIG. 1 illustrates an example computer storage array that utilizes a BMC to configure the network and/or NVMe-oF settings of NVMe-oF storage devices, according to embodiments of the present system and method.

The figures in the drawings are not necessarily drawn to scale and elements of similar structures or functions are generally represented by like reference numerals for illustrative purposes throughout the figures. The figures are only intended to facilitate the description of the various embodiments described herein and do not describe every aspect of the teachings disclosed herein and do not limit the scope of the claims.

DETAILED DESCRIPTION

Each of the features and teachings disclosed herein may be utilized separately or in conjunction with other features and teachings to provide the present system and method. Representative examples utilizing many of these features and teachings, both separately and in combination, are described with reference to the attached figures. While the detailed description herein illustrates to a person of ordinary skill in the art further details for practicing aspects of the present teachings, it does not limit the scope of the claims. Therefore, combinations of features disclosed in the detailed description are representative examples of the present teachings and may not be necessary to practice the teachings in the broadest sense.

According to exemplary embodiments of the present system and method, a baseboard management controller (BMC) may be used to configure the network and/or NVMe-oF settings of an NVMe-oF storage device via the control plane of a computer storage array. The BMC is a low-power controller embedded in computer storage arrays, servers, switches, etc., and connects to chassis sensors (e.g., temperature sensor, power supply voltage sensor, and humidity sensor) to read environmental conditions and to control various devices. The BMC also has access to and control of NVMe-oF devices through local system buses, such as the Peripheral Component Interconnect Express (PCIe) bus and the System Management Bus (SMBus). Thus, the BMC is in a unique position to configure the network and/or NVMe-oF settings of the NVMe-oF devices.

FIG. 1 illustrates an example computer storage array that utilizes a BMC to configure the network and/or NVMe-oF settings of NVMe-oF storage devices, according to embodiments of the present system and method. The computer storage array 100 includes a computer motherboard 101, a local CPU 102, a BMC 103, a PCIe switch 104, a network switch 105, and a plurality of storage devices 106. In this case, the storage devices 106 may be Ethernet-enabled SSDs (eSSDs) including an Ethernet port, a PCIe port, and an SMBus port, and the network switch 105 may be an Ethernet switch. The computer storage array 100 provides one or more remote initiators 107 (e.g., 107a, 107b) with access to one or more of the storage devices 106 connected to the storage array 100.

According to example embodiments, the local CPU 102, BMC 103, PCIe switch 104, and network switch 105 may be integrated or built into the motherboard 101 or may be installed onto the motherboard 101 as discrete components. The computer motherboard 101 includes an Ethernet connectivity, a PCIe bus, and a SMBus. The local CPU 102 is configured to run an operating system for managing networking protocols. The network switch 105 is configured to establish an NVMe-oF connection and route data between the initiators 107 and the storage devices 106. For example, one initiator and one target device may be connected, by the network switch 105, as a pair for a given session. The PCIe switch 104 connects the BMC 103 with each of the storage devices 106 via the PCIe bus.

The BMC 103 is configured to configure a network setting and/or NVMe-oF setting of the storage devices 106 according to a command and a parameter value received from a management server 108. The BMC 103 communicates with the management server 108 via an out-of-band connection separate from the NVMe-oF connection established via the Ethernet connectivity. The BMC 103 may receive the command and the parameter value from the management server 108 using an Intelligent Platform Management Interface (IPMI). The IPMI is a set of computer interface specifications for a computer subsystem, such as the BMC 103, that provides management and monitoring capabilities independently of the system's local CPU, firmware, and operating system.

For example, to set a network setting of the storage devices 106, the management server 108 may send a new "Set Network Configuration" command to the BMC 103. The "Set Network Configuration" command and, similarly, a "Get Network Configuration" command are not currently a part of the standard IPMI command set but may be implemented as vendor specific IPMI commands. Thus, these new commands enable additional functions not present in existing systems and methods. The management server 108 may also send a parameter value for configuring the network settings, such as an IP address of the storage device to be configured, to the BMC 103.

Refer to table below for details.

| NVMe-oF Device Network Configuration - Command Dword XX | |
|---|---|
| Bit | Description |
| 31:08 | Reserved |
| 07:00 | Number of data bytes |

| "Set Features - NVMe-oF Device Network Configuration" Data | | | |
|---|---|---|---|
| Byte | Description | Size | Note |
| 01 | Controller ID | 1 | |
| 02 | Port ID | 1 | |

-continued

| | | | |
|---|---|---|---|
| 06:03 | IPv4 Address | 4 | For RoCE v2 |
| 10:07 | Netmask | 4 | For RoCE v2 |
| 14:11 | Gateway | 4 | For RoCE v2 |
| 30:15 | IPv6 Address | 16 | For RoCE v2 |
| 31 | Address Origination (DHCP/Static) | 1 | For RoCE v2 |
| 37:32 | eRNIC MAC Address | 6 | |
| 38 | Interface Enable/Disable | 1 | |
| 40:39 | MTU (Maximum Transmission Unit) | 2 | Path MTU size |
| 44:41 | Alias Address | 4 | |
| 45 | Alias Enable/Disable | 1 | |
| 46 | Promiscuous Mode (enable, disable) | 1 | |
| 47 | ARP (enable, disable) | 1 | Enable the use of ARP protocol |
| 48 | Multicast (enable, disable) | 1 | Accept all multicast packets |
| 50:49 | Transmit Queue Length | 2 | |
| 51 | Speed (10000 Mbps, 25000 Mbps) | 1 | |
| 52 | Link Duplex (half, full) | 1 | |
| 53 | Auto-negotiation (on, off) | 1 | |
| 54 | Pause frame usage:<br>RX (yes, no)<br>TX (yes, no)<br>Auto negotiation (yes, no) | 1 | |
| 55 | Port Type (fibre, twisted pair, etc.) | 1 | |
| 56 | Link Detected (yes, no) | 1 | |
| 57 | Wake on LAN (yes, no) | 1 | |
| 58 | Supported Port Types | | |
| 59 | Supported Link Modes | | |
| 60 | Supported Pause Frame Use (yes, no) | 1 | |
| 61 | Supported Auto-Negotiation (yes, no) | 1 | |
| 62 | Supported Wake-on LAN (yes, no) | 1 | |
| 63 | Advertised Link Modes | | |
| 64 | Advertised Pause Frame Use (yes, no) | 1 | |
| 65 | Advertised Auto-Negotiation (yes, no) | 1 | |
| 71:66 | Source MAC Address | 6 | Approved source MAC address (for RoCE v1 only) |
| 73:72 | Tx Max Retry | 2 | Max number of retries for transmission of a WQ entry |
| 77:74 | Tx Timer Max Count | 4 | Max count of Tx packet before a retry |

Similarly, to set an NVMe-oF setting of the storage devices 106, the management server 108 may send a new "Set NVMe-oF Configuration" command, which may also be implemented as an OEM-configurable IPMI command, to the BMC 103. The management server 108 may also send a parameter value for configuring the NVMe-oF settings, such as a submission queue size and/or an NVMe Qualified Name of the storage device to be configured, to the BMC 103.

After receiving the command and the parameter value, the BMC 103 may apply the command and the parameter value to one of the storage devices 106 or all of the storage devices 106 according to instructions from management server 108, which may be controlled by a system administrator. If the BMC 103 is instructed to apply the command and the parameter value to all of the storage devices 106, the BMC 103 iteratively configures each of the storage devices according to the command and the parameter value. Otherwise, the BMC 103 configures only the targeted storage device.

The BMC 103 may configure the network setting and/or NVMe-oF setting of the storage devices 106 using the NVMe Management Interface (NVMe-MI) protocol over the Management Component Transport Protocol (MCTP), via the PCIe bus and/or the SMBus. In particular, the BMC 103 may reformat and/or encapsulate the IPMI command and the parameter value received from the management server into an NVMe-MI message, which is then sent over to the storage devices 106 as MCTP packets via the PCIe bus and/or SMBus.

For example, to configure a network setting of a storage device 106, the BMC 103 may send a new "Set Configuration—NVMe-oF Network Settings" command to the storage device 106 via the PCIe or SMBus. The "NVMe-oF Network Settings" portion of the command, which is not currently a part of the standard NVMe-MI command set, may be implemented as a vendor specific field. Similarly, to configure an NVMe-oF setting of a storage device 106, the BMC 103 may send a new "Set Configuration—NVMe-oF Settings" command to the storage device 106 via the PCIe or SMBus. The "NVMe-oF Settings" portion of the command, which is not currently a part of the standard NVMe-MI command set, may also be implemented as a vendor specific field.

The NVMe-oF configuration may be a portion of NVMe-oF Discovery Log Page fields. The following is an example of NVMe-oF Configuration:

| Byte | Description |
|---|---|
| 00 | NVMe Transport Type:<br>RDMA<br>Fibre Channel |
| 01 | Address Family:<br>AF_INET: IPv4<br>AF_INET: IPv6<br>AF_IB: InfiniBand<br>Port ID<br>Controller ID<br>Admin Max Submission Queue Size<br>Transport Service ID<br>NVMe Qualified Name<br>Transport Address (IP address)<br>RDMA Queue Pair Service Type:<br>Reliable Connected<br>Reliable Datagram<br>RDMA Provider Type:<br>InfiniBand<br>RoCE V1 |

-continued

| Byte | Description |
|---|---|
| | RoCE V2 |
| | iWARP |

Figure 2:
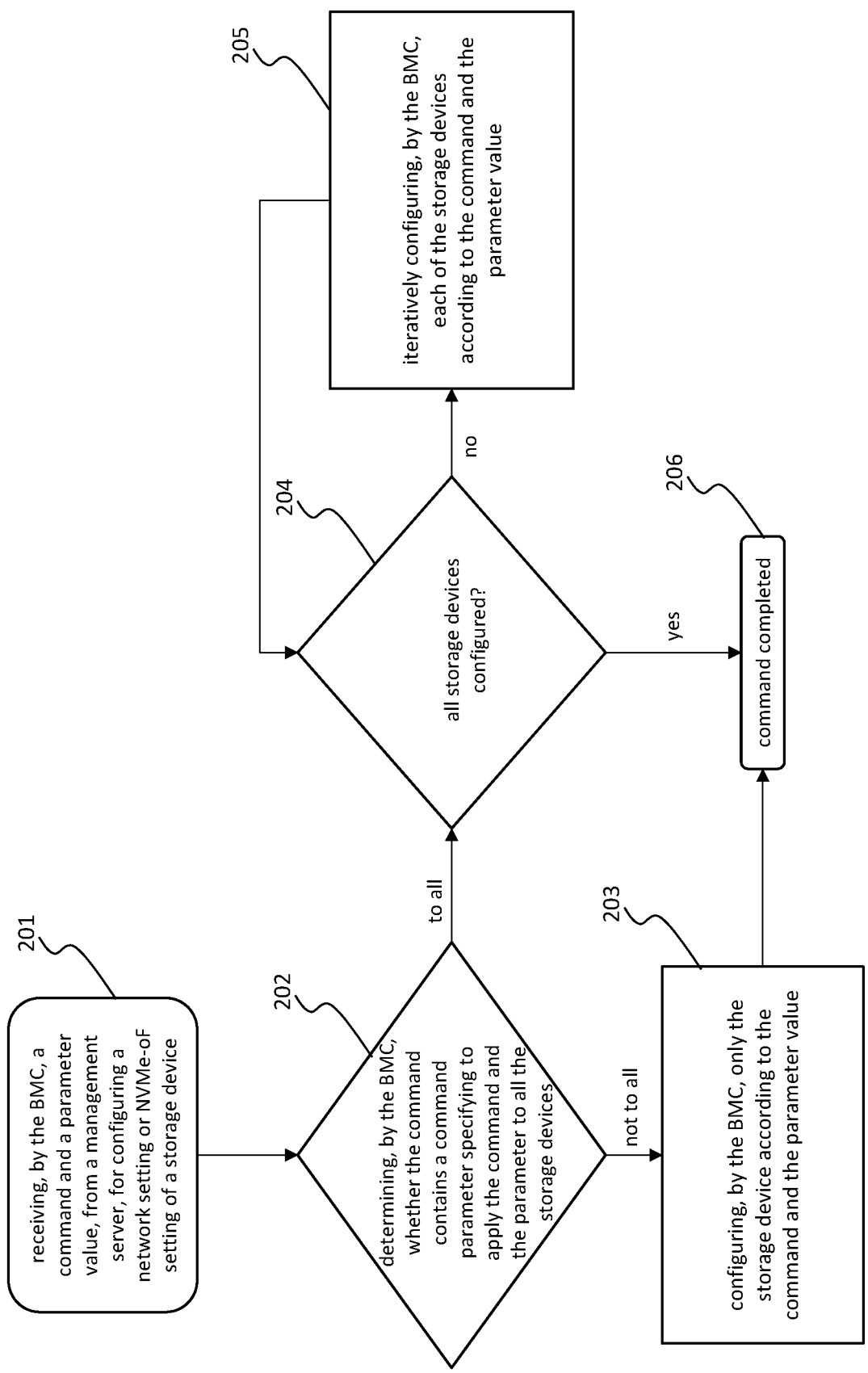
FIG. 2 illustrates a flowchart of example operations for configuring one or more NVMe-oF storage devices using a BMC, according to embodiments of the present system and method.

FIG. 2 illustrates a flowchart of example operations for configuring one or more NVMe-oF storage devices using a BMC, according to embodiments of the present system and method. The BMC receives a command and a parameter value, from a management server, for configuring a network setting and/or NVMe-oF setting of a storage device (at 201). The BMC determines whether the command contains a command parameter specifying to apply the command and the parameter to all the storage devices (at 202). If the BMC determines that the command contains the command parameter (at 202), the BMC iteratively configures each of the storage devices according to the command and the parameter value (at 205). When the BMC determines that all the storage devices have been configured (at 204), the command is completed (at 206). If the BMC determines that the command does not contain the command parameter (at 202), the BMC configures only the storage device according to the command and the parameter value (at 203) and the command is completed (at 206).

As traditionally implemented, the BMC operates as a root complex device in which the CPU has unidirectional control over the BMC. In other words, the traditionally implemented BMC receives instructions from the CPU and does not operate independently of the CPU. In contrast, according to example embodiments of the present system and method, the BMC may be implemented such that the BMC operates independently of and without intervention from the CPU of the computer storage array. In other words, the BMC may operate as an endpoint device. By not requiring the CPU to intervene in the configuration of the storage devices by the BMC, a clearer delineation between the data plane and the control plane is achieved, and the computer storage array may be less prone to crashing due to less context switching between synchronous and asynchronous processes.

Accordingly, in view of the foregoing, embodiments of the present system and method provide utilize a BMC to configure the network and/or NVMe-oF device settings of the NVMe-oF devices via the control plane of the computer storage array, which results in faster configuration after system initialization. Furthermore, because the present system and method do not require modifications to the data plane of the computer storage array, the initiators are still able to configure the network and/or NVMe-oF settings of the NVMe-oF devices.

Various embodiments of the present system and method may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The foregoing description, for purpose of explanation, has been described with reference to specific embodiments. However, the illustrative discussions above are not intended to be exhaustive or to limit the scope of the claims to the precise forms disclosed. Many modifications and variations are possible in view of the above teachings. The embodiments were chosen in order to best explain the principles underlying the claims and their practical applications, to thereby enable others skilled in the art to best use the embodiments with various modifications as are suited to the particular uses contemplated.

What is claimed is:

1. A computer storage array providing at least one remote initiator with non-volatile memory express (NVMe) over Fabrics (NVMe-oF) access to at least one storage device connected to the storage array, the computer storage array comprising:
   a first processor configured to manage at least one networking protocol;
   a network switch configured to route data between the at least one remote initiator and the at least one storage device;
   a second processor configured to configure a setting of the at least one storage device; and
   a motherboard to which the first processor, the network switch, and the second processor are coupled,
   wherein the at least one remote initiator is capable of accessing data stored in the at least one storage device via a synchronous process according to the at least one networking protocol, and
   wherein the second processor receives a command for configuring the setting of the at least one storage device and configures the setting of the at least one storage device according to the command via an asynchronous process separate from the synchronous process.

2. The computer storage array of claim 1, wherein the second processor operates as an endpoint device and configures the setting of the at least one storage devices independently of and without intervention from the first processor.

3. The computer storage array of claim 1, wherein the second processor receives the command via an out-of-band connection, reformats the command to a packet compatible with a control plane of the computer storage array, and sends the packet to the at least one storage device over the control plane.

4. The computer storage array of claim 3, wherein the command includes a parameter value for configuring the at least one storage device received from a management server.

5. The computer storage array of claim 4, wherein the second processor is configured to configure the setting of the at least one storage device according to the command and the parameter value received.

6. The computer storage array of claim 5, wherein the control plane includes a peripheral control interconnect express (PCIe) bus, and wherein the second processor is configured to configure the setting of the at least one storage device using an NVMe Management Interface (NVMe-MI) protocol over the PCIe bus.

7. The computer storage array of claim 5, wherein the control plane includes a system management bus (SMBus), and wherein the second processor is configured to configure the setting of the at least one storage device using an NVMe-MI protocol over the SMBus.

8. The computer storage array of claim 6, wherein the second processor is configured to receive the command and the parameter value from the management server using an Intelligent Platform Management Interface (IPMI).

9. The computer storage array of claim 8, wherein the setting of the at least one storage device includes an Interpret Protocol (IP) address assigned to the at least one storage device.

10. The computer storage array of claim 8, wherein the setting of the at least one storage device includes at least one of a submission queue size and an NVMe Qualified Name of the at least one storage device.

11. The computer storage array of claim 4, wherein the second processor is configured to iteratively configure the at least one storage devices according to the parameter value of the command indicating that the parameter value applies to other storage devices connected to the storage array.

12. The computer storage array of claim 1, wherein the at least one storage device is an NVMe-oF device, wherein the NVMe-oF device is configured to:
  receive a second command and a parameter value from the at least one remote initiator via a network connection traversing the network switch; and
  update the setting of the NVMe-oF device according to the second command and the parameter value.

13. The computer storage array of claim 12, wherein the at least one storage device is Ethernet-enabled and includes a PCIe port and an Ethernet port.

14. A computer-implemented method of configuring at least one storage device connected to a computer storage array, the computer storage array comprising a first processor configured to manage at least one networking protocol and a second processor configured to configure a setting of the at least one storage device, at least one remote initiator being capable of accessing data stored in the at least one storage device via a synchronous process according to the at least one networking protocol, the method comprising:
  receiving, by the second processor, a command and a parameter value, from a management server, for configuring the setting of the at least one storage device; and
  configuring the setting of the at least one storage device, by the second processor, according to the command and the parameter value received from the management server via an asynchronous process separate from the synchronous process.

15. The computer-implemented method of claim 14, wherein the second processor receives the command via an out-of-band connection, reformats the command to a packet compatible with a control plane of the computer storage array, sends the packet to the at least one storage device over the control plane, and configures the setting of the at least one storage device using the packet according to a non-volatile memory express (NVMe) Management Interface (NVMe-MI) protocol.

16. The computer-implemented method of claim 15, wherein the control plane includes a system management bus (SMBus) and a peripheral control interconnect express (PCIe) bus, and wherein the second processor configures setting of the at least one storage device using the NVMe-MI protocol over the SMBus or the PCIe bus.

17. The computer-implemented method of claim 14, wherein the second processor receives the command and the parameter value from the management server using an Intelligent Platform Management Interface (IPMI).

18. The computer-implemented method of claim 14, wherein the setting of the at least one storage device includes an Internet Protocol (IP) address assigned to the at least one storage device.

19. The computer-implemented method of claim 14, wherein the setting of the at least one storage device includes at least one of a submission queue size and an NVMe Qualified Name of the at least one storage device.

20. The computer-implemented method of claim 14, further comprising:
  iteratively configuring, by the second processor, the at least one storage devices according to the parameter value of the command indicating that the parameter value applies to other storage devices connected to the storage array.

* * * * *